United States Patent Office 3,561,807
Patented Feb. 9, 1971

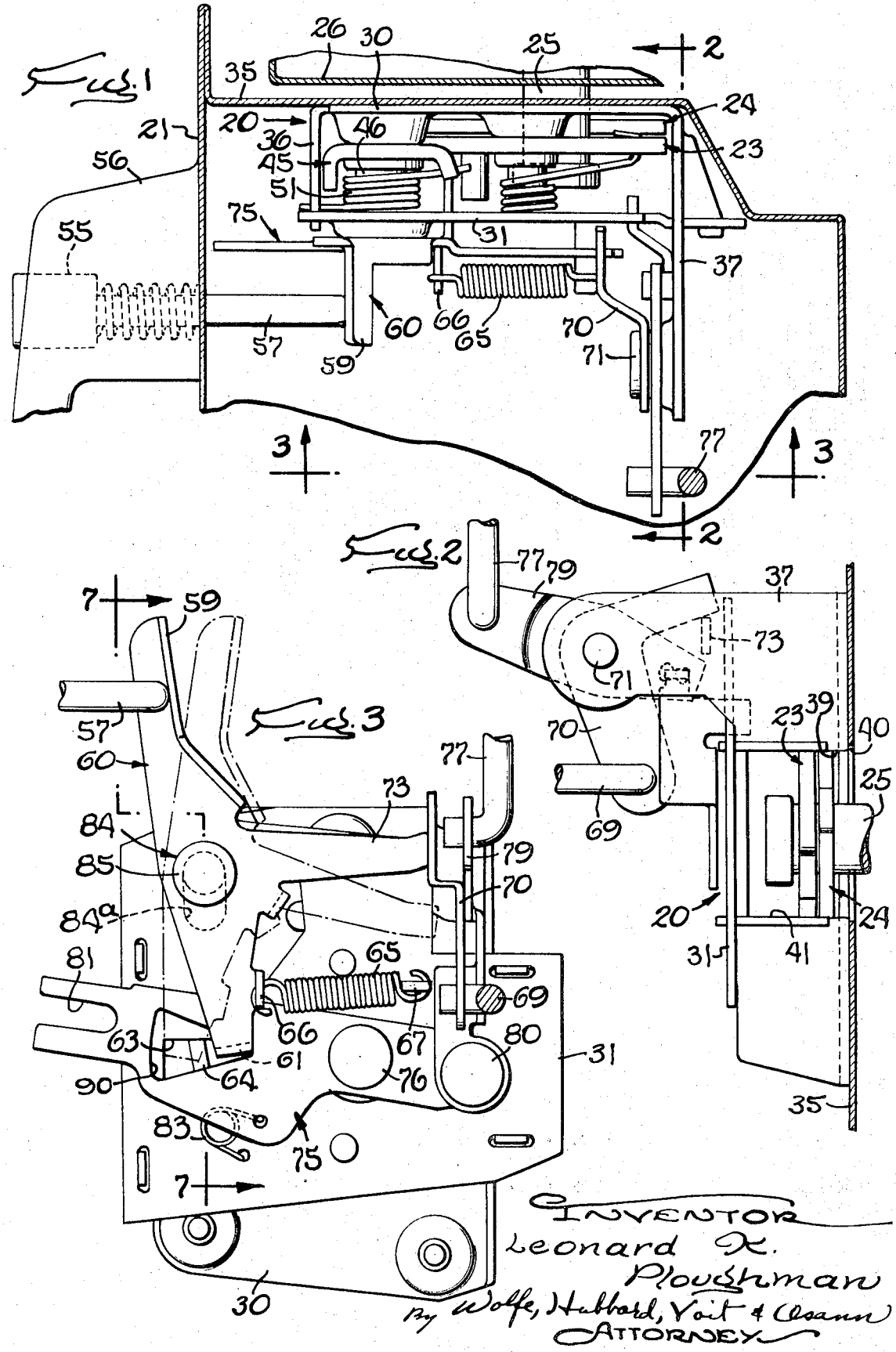

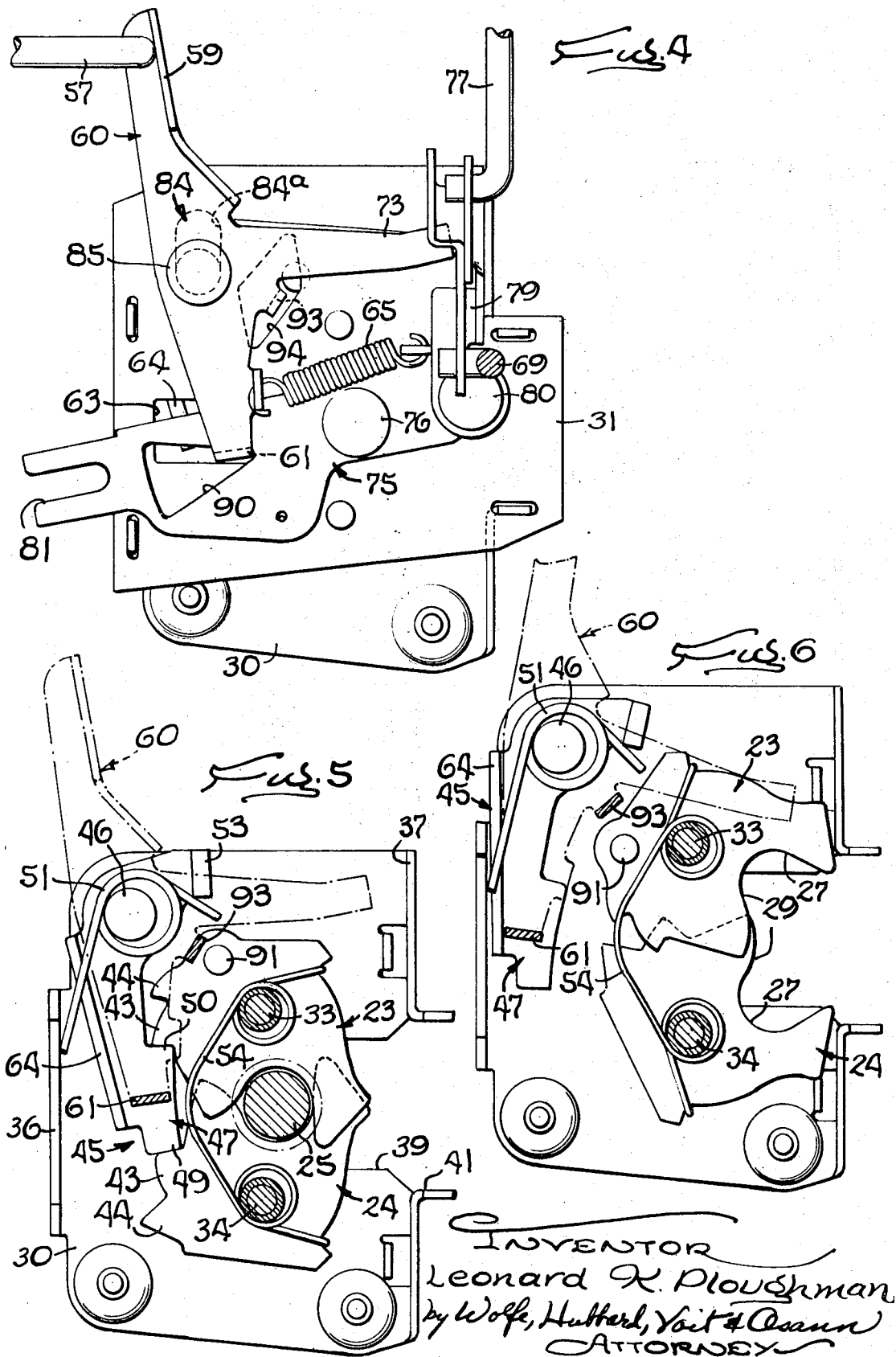

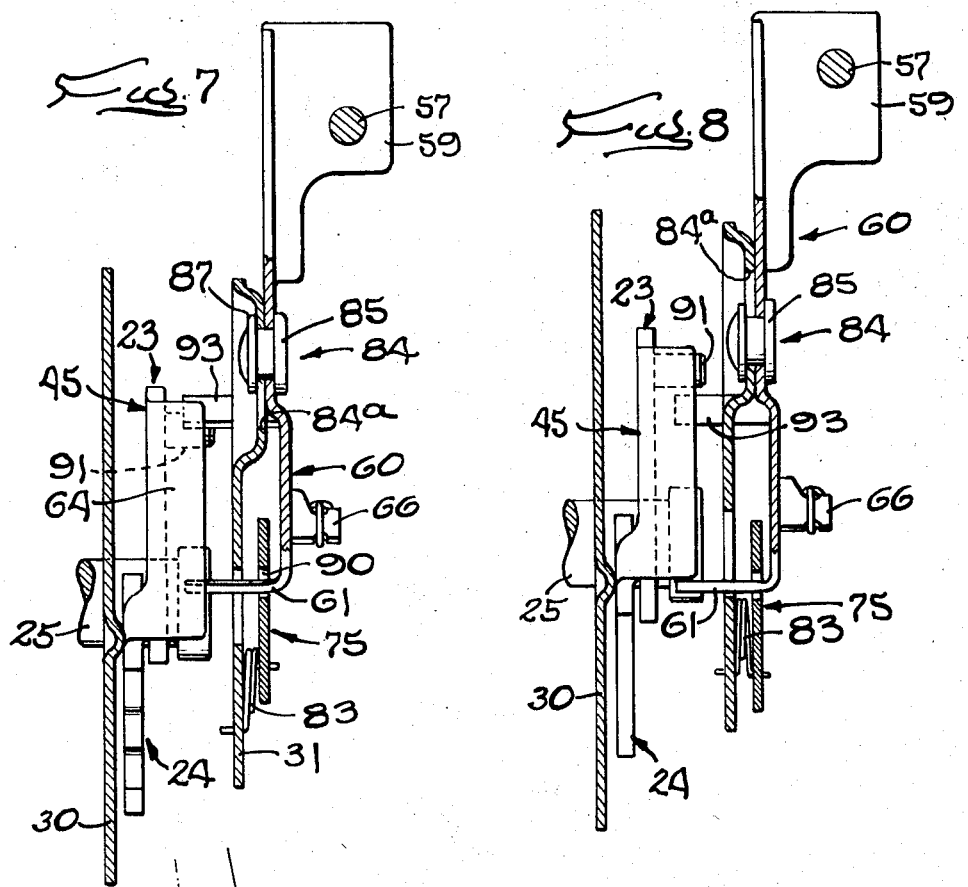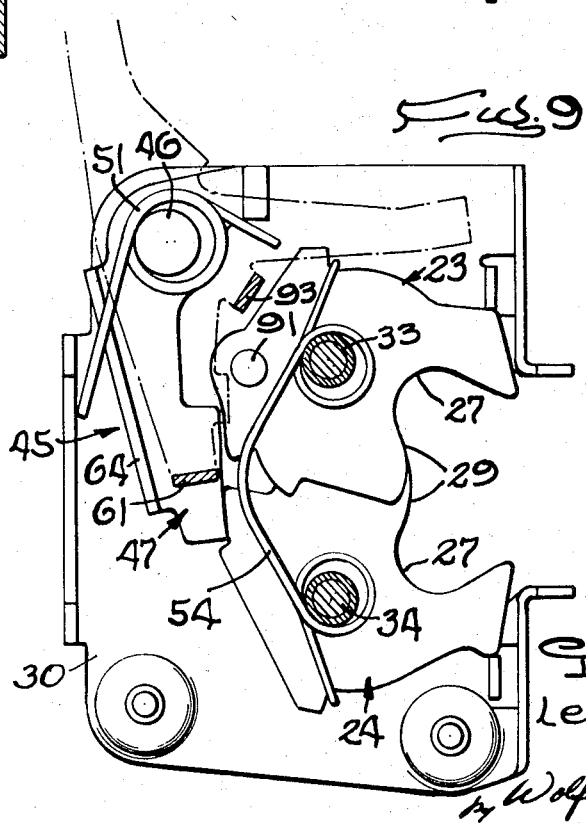

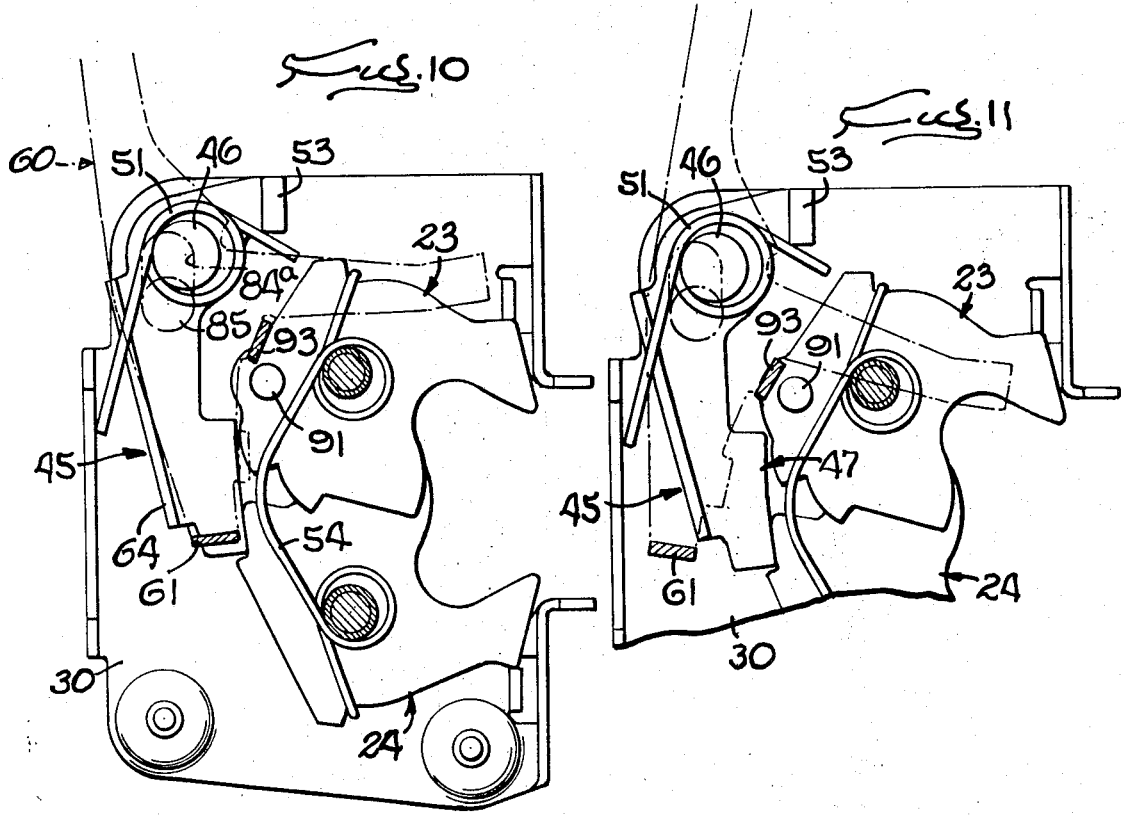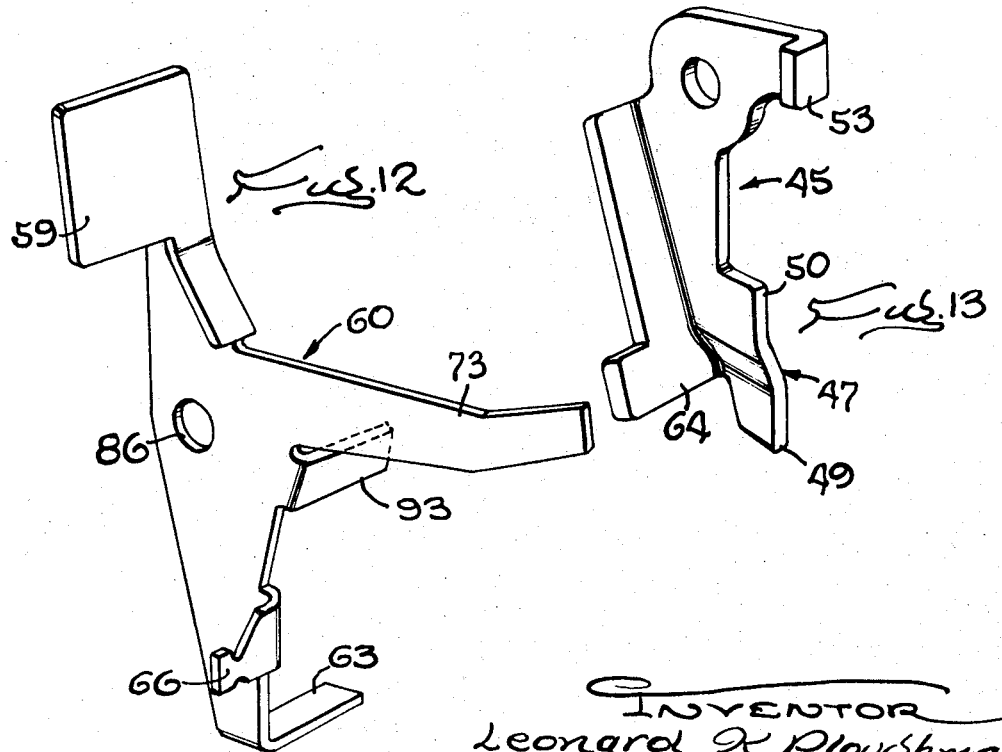

3,561,807
FREE-WHEELING LATCH FOR VEHICLE DOORS
Leonard K. Ploughman, Rockford, Ill., assignor to Atwood Vacuum Machine Company, Rockford, Ill., a corporation of Illinois
Filed Oct. 22, 1968, Ser. No. 769,488
Int. Cl. E05c 3/26
U.S. Cl. 292—216                                        9 Claims

ABSTRACT OF THE DISCLOSURE

A free-wheeling, dual preset latch for a vehicle door includes a contactor which is mounted both for turning and for bodily shifting and which is coupled to a locking lever by a finger-and-slot connection permitting turning of the contactor relative to the locking lever while enabling the locking lever to shift the contactor bodily.

BACKGROUND OF THE INVENTION

This invention relates to a latch of the type commonly used for holding the door of a vehicle in a closed position and, more particularly, to a so-called free-wheeling latch of the type in which the primary operating elements of the latch turn about parallel axes. Such a latch generally includes a manual actuator operable from the outside of the door and normally effective, upon being moved to an operated position, to trip a pawl to release the latch and permit opening of hte door. When a pivoted locking lever is turned to a locked position by a key from the outside of the vehicle or by a garnish button or other member from the inside of the vehicle, the latch is set in a locked condition such that the actuator, upon being operated, simply free-wheels or makes an idle motion with respect to the pawl without tripping the latter. A free-wheeling latch of this general type is disclosed in my copending application entitled Latch for Vehicle Doors, filed Aug. 8, 1968, Ser. No. 751,194.

SUMMARY OF THE INVENTION

The primary aim of the present invention is to provide a new and improved free-wheeling latch of the above character which, when compared with prior latches of the same general type, requires a fewer number of parts to produce the free-wheeling action. A more detailed object is to provide a novel latch in which the free-wheeling is effected simply through the coaction of the actuator, the pawl and the locking lever and without requiring the incorporation of any substantial additional parts into the latch.

The invention also resides in the novel and simplified manner of mounting the actuator for both turning and bodily shifting, and in the unique connection coupling the actuator to the locking lever to effect bodily shifting of the actuator in response to turning of the locking lever while permitting independent turning of the actuator to its operated position.

Another important object of the invention is to maintain the basic simplicity of the latch while adapting the latch for keyless locking from the outside of the vehicle if two separate manual operations are performed to preset the latch prior to closing of the door.

Other objects and advantages of the invention will become apparent from the following detailed description taken in conjunction with the accompanying drawings.

BRIEF DESCRIPTION OF THE DRAWINGS

FIG. 1 is a fragmentary cross-section taken through a vehicle door equipped with a new and improved latch incorporating the novel features of the present invention.

FIG. 2 is a fragmentary cross-section taken substantially along the line 2—2 of FIG. 1.

FIG. 3 is af ragmentary cross-section taken substantially along the line 3—3 of FIG. 1 and showing the latch in a latched and unlocked condition.

FIG. 4 is a view similar to FIG. 3 but showing the latch in a latched and locked condition.

FIG. 5 is a view similar to FIG. 3 but with parts broken away for purposes of clarity, the latch being shown in a latched and unlocked condition.

FIG. 6 is a view similar to FIG. 5 but showing the latch being unlatched with the actuator turned to its operated position.

FIG. 7 is a fragmentary cross-section taken substantially along the line 7—7 of FIG. 3 and showing the latch in an unlocked condition.

FIG. 8 is a view similar to FIG. 7 but showing the latch in a locked condition.

FIG. 9 is a view similar to FIG. 5 but showing the latch in an unlatched condition.

FIG. 10 is a view similar to FIG. 9 but showing the latch with one of two necessary manual operations having been performed on the latch to preset the latter for keyless locking.

FIG. 11 is a view of parts illustrated in FIG. 10 but showing the parts with the second manual operation having been performed to preset the latch for keyless locking.

FIG. 12 is a perspective vew of the actuator.
FIG. 13 is a perspective view of the pawl.

DESCRIPTION OF THE PREFERRED EMBODIMENT

As shown in the drawings for purposes of illustration, the invention is embodied in a latch 20 for holding the door 21 of a vehicle in a closed position. The latch specifically illustrated herein is of the so-called bear claw type and includes two pivoted latching elements 23 and 24 (FIG. 5) carried by the door and adapted to embrace a cylindrical striker pin 25 mounted on a post 26 (FIG. 1) of the vehicle frame to hold the door tightly closed.

Each of the latching elements 23 and 24 is formed with a striker-receiving recess 27 (FIG. 6) and, as the door 21 is swung closed, contact of an edge 29 of the recess with the striker 25 turns the latching element from an unlatched position shown in FIG. 6 to a safety or secondary latched position (not shown) and then to a fully latched position shown in FIG. 5. In latching, the latching element 23 turns in a clockwise direction while the latching element 24 turns in a counterclockwise direction, the edges of the two recesses 27 moving into enclosing relation with the striker and preventing separation of the latching elements from the striker to hold the door closed and latched.

Herein, the latching elements 23 and 24 are located between a pair of vertical base plates 30 and 31 (FIG. 1) and are pivoted on fixed studs 33 and 34 (FIG. 5), respectively, which extend horizontally between the base plates, the latter being spaced from and fastened to each other and housed within the door 21. The base plate 30 is attached to the end wall 35 of the door and is formed with side flanges 36 and 37 (FIG. 1) extending between the two plates and along the side walls of the door. Alined recesses 39 and 40 (FIG. 2) in the base plate 30 and the end wall 35 together with an opening 41 in the flange 37 expose the latching elements 23 and 24 for latching with the striker 25 when the door is swung to its closed position.

Formed on one edge of each of the latching elements 23 and 24 is a pair of angularly spaced teeth 43 and 44 (FIG. 5) adapted to cooperate with a pawl 45 which is operable to hold the latching elements in their latched positions and to release the latching elements for turning to their unlatched positions. The pawl, which is located between the base plates 30 and 31, is fulcrumed on a stud 46 fixed to and projecting from the base plate 30 and is formed with an integral finger 47 (FIG. 9) extending alongside the toothed edges of the latching elements. One lower corner of the finger defines a detent 49 engageable with the teeth 43 and 44 of the latching element 24 while an upper corner of the finger defines a detent 50 engageable with the teeth of the latching element 23 (see FIGS. 5 and 13). A torsion spring 51 (FIG. 5) encircling the stud 46 and held by a flange 53 on the pawl urges the latter counterclockwise about the stud to press the detents 49 and 50 into engagement with the teeth of the latching elements. When the detents engage the teeth 43, the latching elements are held in their fully latched positions (FIG. 5) and, when the detents engage the teeth 44, the latching elements are held in their secondary latched positions (not shown). Clockwise turning of the pawl 45 about the stud 46 releases both detents from their respective latching elements and enables the latching elements to turn to their unlatched positions shown in FIG. 6 to release the striker 25 and permit opening of the door 21. A spring 54 coiled around the studs 33 and 34 and anchored elements continuously urges the latter toward their unlatched positions to effect automatic unlatching when the pawl is released.

To release the latch 20 from the outside of the vehicle, a push button 55 (FIG. 1) is mounted slidably in an outside handle 56 on the outer wall of the door 21 and is operable, when depressed, to swing the pawl 45 clockwise about the stud 46 to release the detents 49 and 50 and enable the spring 54 to turn the latching elements 23 and 24 to their unlatched positions. When the push button is depressed, a rod 57 slidably mounted in the door is pushed inwardly against an offset flange 59 formed on the upper end of an actuator lever or contactor 60 which is mounted on the outer side of the base plate 31 for turning from a normal position (FIG. 4) to an operated position (FIG. 6). When the contactor is turned clockwise to its operated position, a projection or finger 61 formed integrally with the lower end of the contactor and projecting inwardly toward the pawl 45 through a hole 63 (FIG. 3) in the base plate 31 normally engages a flange 64 on the pawl and swings the latter in a clockwise direction to free the latching elements 23 and 24 to turn to their unlatched positions. Upon release of the push button 55, the contactor is turned counterclockwise and is returned to its normal position by a contractile spring 65 (FIG. 3) stretched between a tab 66 on the contactor and a tab 67 projecting from the base plate 31.

To release the latch 20 from the inside of the vehicle, a remote handle (not shown) positioned on the inside of the door 21 is connected to a rod 69 (FIGS. 2 and 3) which is attached to a bell crank 70 fulcrumed on a pin 71 fixed to the flange 37. When the inside handle is actuated, the bell crank is pivoted clockwise (FIG. 2) about the pin 71 to cause an arm of the crank to engage the upper edge of an arm 73 formed integrally with the contactor 60. As an incident to such engagement, the contactor is actuated or turned clockwise to its operated position to trip the pawl.

The latch 20 is adapted to be locked and unlocked in response to the turning of a locking lever 75 between a locked position (FIG. 4) and an unlocked position (FIG. 3). As shown in FIG. 3, the locking lever is pivoted intermediate its ends on a stud 76 fastened to the base plate 31 and is located on the outer side of such plate near the lower end of the contactor 65. To turn the locking lever between its locked and unlocked positions, a garnish button (not shown) or other suitable actuator accessible from the inside of the door 21 is connected to a vertical rod 77 which in turn is coupled to a linkage 79 pivoted on the pin 71. The linkage 79 is connected pivotally at its lower end to one end of the locking lever by a rivet 80 (FIG. 3) and is arranged such that up and down movement of the garnish button and the rod 77 turns the locking lever back and forth between its locked and unlocked positions. In addition, the locking lever may be turned from the outside of the vehicle by a key which, when inserted into and rotated within a keywell (not shown), actuates a link (not shown) adapted to be connected to a yoke 81 formed on the end of the locking lever opposite the rivet 80. A toggle spring 83 (FIG. 3) anchored between the locking lever and the base plate 31 snaps back and forth over center as the lever is turned between its locked and unlocked positions and serves to hold the lever releasably in each of the positions.

When the locking lever 75 is turned to its locked position, the contactor 60 is uncoupled from the pawl 45, and upon being actuated, simply makes an idle motion with respect to the pawl without tripping the latter and effecting release of the latching elements 23 and 24. That is, the contactor free-wheels relative to the pawl when actuated with the locking lever in its locked position and thus the latch 20 remains latched and locked.

In accordance with one important aspect of the present invention, the free-wheeling action is achieved with fewer parts than has been possible heretofore by attaching the contactor 60 to the base plate 31 with a unique pin-and-slot connection 84 (FIG. 3) which not only mounts the contactor for turning between its normal and operated positions but also for bodily shifting between positions in which the contactor is coupled to and uncoupled from the pawl 45. Moreover, the contactor is attached directly to the locking lever 75 in a simplified manner to cause bodily shifting of the contactor between its coupling and uncoupling positions as an incident to turning of the locking lever between its unlocked and locked positions while still enabling turning of the contactor relative to the locking lever between its normal and operated positions. As a result, the latch 20 is made free-wheeling and yet requires comparatively few parts.

More particularly, the pin-and-slot connection 84 for mounting the contactor 65 comprises an oblong slot 84a (FIG. 3) which herein is formed through the base plate 31 with its longer axis extending in a generally vertical direction. A headed pin 85 extending loosely through a hole 86 (FIG. 12) in the contactor projects slidably into the slot 84a and is captivated therein by a washer 87 (FIG. 7) fast on the inner end of the pin. With this arrangement, the contactor may pivot about the pin 85 between its normal and operated positions (FIGS. 5 and 6) and also may shift bodily with the pin between its coupling position (FIGS. 3 and 5) and its uncoupling position (FIGS. 4 and 10) as the pin is slid upwardly and downwardly in the slot 84a.

When the contactor 60 is disposed in its coupling position (FIGS. 3, 5 and 7) with the pin 85 located in the upper portion of the slot 84a, the finger 61 on the contactor lies directly alongside the flange 64 on the pawl 45. Accordingly, the finger engages the flange and trips the pawl when the contactor is turned clockwise about the pin to its operated position (see FIG. 6). When moved to its uncoupling position, the contactor 60 shifts bodily and downwardly along the base plate 31, the pin 85 sliding into the lower portion of the slot 84a (see FIGS. 4, 8 and 10). In this position of the contactor, the finger 61 is disposed below the flange 64 and, as a result, simply passes by the flange when the contactor is actuated. Accordingly, the contactor freewheels without tripping the pawl 45 and without causing release of the latchig elements 23 and 24. The latch thus is locked.

As pointed out above, the contactor 60 is connected directly to the locking lever 75 and is shifted back and forth between its coupling and uncoupling positions as the locking lever is turned between its unlocked and locked positions (FIGS. 3 and 4). To advantage, the connection between the contactor and the locking lever is effected simply by projecting the finger 61 on the lower end of the contactor through a uniquely designed slot 90 formed through the locking lever. As shown most clearly in FIG. 3, the slot is generally triangular in shape and overlies the opening 63 in the base plate 31. The finger 61 projects through the slot 90 and the opening 63 into opposing relation with the flange 64 on the pawl 45 and, when the contactor is in its normal position, is located adjacent one apex of the slot. Accordingly, when the locking lever 75 is turned counterclockwise about the stud 76 to its locked position (FIG. 4), the upper edge of the slot 90 engages the finger 61 to slide the contactor downwardly to its uncoupling positon so that the finger 61 will pass by the flange 64 when the contactor is actuated. When the locking lever is returned to its unlocked position (FIG. 3), the lower edge of the slot 90 engages the finger 61 to slide the contactor back upwardly to its coupling position in which the finger directly opposes the flange 64 so as to trip the pawl 45 when the contactor is actuated.

Because of the triangular shape of the slot 90, the finger 61 may move within the slot and relative to the locking lever 75, regardless of the position of the latter, when the contactor 60 is turned between its normal and operated positions. With the finger 61 being located in the apex of the slot 90 when the contactor is in its normal position, the lower edge of the slot engages the finger and prevents the contactor from shifting downwardly to its uncoupling position. As the contactor is turned to its operated position when the locking lever is in its unlocked position, the toggle spring 83 urges the locking lever clockwise about the stud 76 to keep the lower edge of the slot 90 pressed continuously against the finger 61 to retain the contactor in its coupling position. In the operated position of the contactor, the finger is disposed adjacent the short base of the triangular-shaped slot.

From the foregoing, it will be apparent that the simple pin-and-slot connetcion 84 between the base plate 31 and the contactor 60 and the novel finger-and-slot connection 61 and 90 between the contactor and the pivoted locking lever 75 enable the incorporation of free-wheeling into the latch 20 without the need of using separate coupling members, force transfer elements and the like. As a result, the latch 20 requires comparatively few parts and is relatively simple in construction. In addition, the use of the finger 61 for tripping the pawl 45 and for also connecting the contactor to the locking lever contributes to the simplicity of the latch.

In another but related aspect, the invention contemplates maintaining the basic simplicity of the latch 20 while making the latch self-cancelling and, at the same time, capable of keyless locking from the outside of the vehicle if two separate preset operations are performed on the latch prior to closing of the door 21. That is, the latch is self-cancelling in that it is set automatically in an unlocked condition as the door is closed so as to prevent unintentional and inadvertent locking of the door. The self-cancelling action, however, may be disabled to allow the latch to remain in a locked condition when the door is closed by intentionally presetting the latch with two separate operations prior to such closing.

More particularly and as shown in FIG. 10, a so-called kick-out pin 91 is fastened to one side of the latching element 23 and moves with the latching element along an arcuate path when the latching element turns from its unlatched position (FIG. 10) to its latched position (FIG. 5). A lug 93 formed integrally with the contactor and projecting through an opening 94 (FIG. 4) in the base plate 31 is located within the path of the kick-out pin 91 as shown in FIG. 10 when the contactor is disposed in its normal and uncoupling positions. Thus, if the locking lever 75 is turned to its locked position and the contactor 60 shifted to its uncoupling position by accidental depression of the garnish button when the door 21 is open, the kick-out pin 91 will engage the lower edge of the lug 93 as the door is closed and as the latching element 23 is turned clockwise from its unlatched position to its latched position. As a result of such engagement, the contactor 60 is automatically shifted back upwardly to its coupling position, and the finger 61 engages the upper edge of the slot 90 to return the locking lever 75 to its unlocked position. Accidental locking of the door thus is prevented since the locking action is cancelled to restore the latch automatically to an unlocked condition if the door is closed with the locking lever having simply been set in its locked position by depression of the garnish button.

The latch 20 stays locked, however, if two preset operations are performed. That is, the latch will remain locked if the contactor 60 is held in its operated position as the door 21 is closed with the locking lever 75 having first been set in its locked position to shift the contactor to its uncoupling position. When the outside push button 55 is depressed with the contactor in its uncoupling position, the contactor is turned about the pin 85 to its operated position to swing the lug 93 out of the path followed by the kick-out pin 91 (see FIG. 11). Accordingly, if the push button is held in a depressed condition during closing of the door, the kick-out pin simply passes by the lug without engaging the latter as the latching element 23 turns to its latched position. Thus, the contactor 60 remains in its uncoupling position and the latch remains in a locked condition as the door is closed.

It will be apparent from the foregoing that the latch 20 may be made self-cancelling and capable of dual preset keyless locking simply by adding the kick-out pin 91 to the latching element 23 and by forming the lug 93 on the contactor 60. These additional advantageous features thus may be incorporated into the latch while maintaining its basic simplicity.

I claim as my invention:

1. A free-wheeling latch for a vehicle door and comprising a base; a latching element mounted on said base for turning about a predetermined axis between latched and unlatched positions; and a pawl mounted on said base for holding said latching element in said latched position and releasable from the latching element to free the latter for turning to said unlatched position; the improvement in said latch comprising; an actuator lever; a pin-and-slot connection between said actuator lever and said base and mounting said actuator lever for turning between normal and operated positions about an axis parallel to said one axis and also for bodily shifting between coupling and uncoupling positions with respect to said pawl in a direction transversely of the axis of the pin of said connection; said actuator lever being operable, when in said coupling position and upon being turned to said operated position, to engage said pawl and release the latter from said latching element; said actuator lever being operable, when in said uncoupling position and upon being moved to said operated position, to free-wheel with respect to said pawl whereby the latter continues to hold said latching element in said latched position; a locking lever mounted on said base to turn between locked and unlocked positions; a projection on one of said levers and extending into a slot in the other of said levers; said projection and the edges of said slot being engageable with one another to cause bodily shifting of said actuator lever between said coupling and uncoupling positions when said locking lever is turned between said unlocked and locked positions, respectively; and said slot being shaped to permit relative movement of said projection within said slot when said actuator lever is disposed in either of said coupling or uncoupling positions and is turned between said normal and operated positions.

2. A latch as defined in claim 1 in which said pin-and-slot connection comprises a slot formed in said base, and a pin pivotally mounting said actuator and projecting slidably into said slot.

3. A latch as defined in claim 1 in which said slot is formed through said locking lever, said projection comprising a finger formed integrally with said actuator lever and projecting into said slot.

4. A latch as defined in claim 3 in which said finger is positioned to engage said pawl and release the latter from said latching element when said actuator lever is in said coupling position and is turned to said operated position.

5. A latch as defined in claim 3 in which said slot is generally triangular in shape, said finger being located adjacent one apex of the slot when said actuator lever is in said normal position and being located adjacent the opposing base of the slot when said actuator is in said operated position.

6. A free-wheeling, dual preset latch for a vehicle door and comprising a base; a latching element mounted on said base for turning about a predetermined axis between latched and unlatched positions; and a pawl mounted on said base for holding said latching element in said latched position and releasable from the latching element to free the latter for turning to said unlatched position; the improvement in said latch comprising; an actuator lever; a pin-and-slot connection between said actuator lever and said base and mounting said actuator lever for turning between normal and operated positions about an axis parallel to said one axis and also for bodily shifting between coupling and uncoupling positions with respect to said pawl; a locking lever mounted on said base to turn between locked and unlocked positions; a projection formed integrally with said actuator lever and extending into a slot formed through said locking lever; said projection and the edges of said slot being engageable with one another to cause bodily shifting of said actuator lever between said coupling and uncoupling positions when said locking lever is turned between said unlocked and locked positions, respectively; said slot being shaped to permit relative movement of said projection within said slot when said actuator lever is disposed in either of said coupling or uncoupling positions and is turned between said normal and operated positions; said projection being positioned to engage said pawl and release the latter from said latching element when said actuator lever is in said coupling position and is turned to said operated position; said projection, when said actuator lever is in said uncoupling position and is turned to said operating position, free-wheeling with respect to said pawl whereby the latter continues to hold said latching element in said latched position; a kick-out member movable with said latching element and along a predetermined path into engagement with said actuator lever to shift the latter to said coupling position as the latching element is turned to said latched position with the actuator lever disposed in said normal and uncoupling positions; and said actuator lever being located out of the path of movement of said kick-out member when disposed in said uncoupling and operated positions whereby the actuator lever remains in said uncoupling position as the latching element is turned to said latched position.

7. A latch as defined in claim 6 in which said pin-and-slot connection comprises a slot formed in said base, and a pin pivotally mounting said actuator and projecting slidably into the slot in said base.

8. A latch as defined in claim 6 in which said slot is generally triangular in shape, said projection being located adjacent one apex of the slot when said actuator lever is in said normal position and being located adjacent the opposing base of the slot when said actuator is in said operated position.

9. A latch as defined in claim 6 further including a lug formed integrally with said actuator lever and projecting into the path of said kick-out member when said actuator lever is in said uncoupling and normal positions, said lug being disposed out of said path when said actuator lever is in said uncoupling and operated positions.

References Cited

UNITED STATES PATENTS 3,149,866  9/1964  Gergoe et al. _____ 292—216

RICHARD E. MOORE, Primary Examiner